United States Patent Office 2,746,891
Patented May 22, 1956

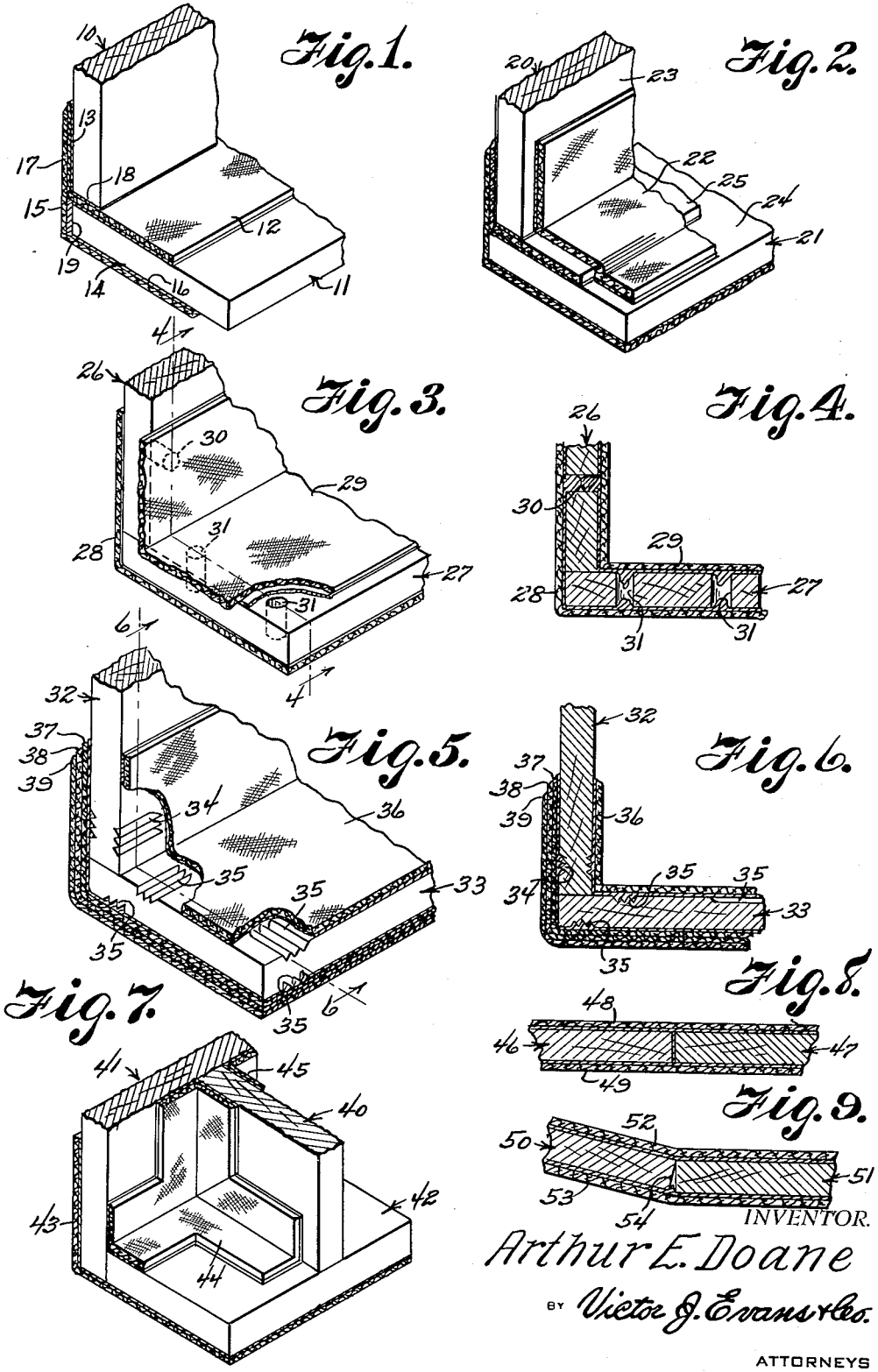

2,746,891
STRUCTURAL JOINT CONNECTION IN PANEL CONSTRUCTION

Arthur E. Doane, Stamford, Conn.

Application February 15, 1952, Serial No. 271,821

4 Claims. (Cl. 154—43)

This invention relates to a joint or structural connection or bond used primarily in wall construction and particularly for connecting adjoining edges of sides, bottoms, and partitions of ships, and in particular layers of fiberglass extended over adjoining edges of panels or sections of walls and the like, and wherein the fiberglass is bonded to the materials of the panels.

The purpose of this invention is to provide an improved connection for joining edges of panels of boats and sheet material without the use of nails, screws, brackets, and other metal or other fastening elements.

In the conventional type of construction walls or panels are connected by mechanical means such as nails, screws, bolts, rivets, welding, and the like and these require fitted connections which are costly for some uses, such as in the construction of boats and ships. With this thought in mind this invention contemplates a method of joining edges of wall sections, panels and sheet material wherein the edges are held together in abutting relation, and the abutting edges are coated with layers or strips of fiberglass with a suitable plastic which forms a bond with the surfaces of the materials, whereby pieces of solid materials such as wood, cured plastic, metal, and other materials may be positively bonded together without conventional fastening elements.

The object of this invention is, therefore, to provide means for bonding structural elements and the like by applying layers of plastic over or across adjoining edges of the elements and particularly parts of boats and containers.

Another object of the invention is to provide an improved method of bonding pieces of material without accurately fitting the adjoining edges of the materials.

A further object of the invention is to provide an improved method of bonding structural elements which is comparatively simple and inexpensive.

With these and other objects and advantages in view the invention embodies the method of forming a positive bond between pieces of material by holding one piece of material in abutting relation with another and applying layers of fabric such as fiberglass in strips over the adjoining edges of the pieces of material wherein the plastic material is cemented to the surfaces of the said pieces of material so that a bond is provided.

This invention, therefore, relates to a method of joining pieces of material particularly of boats and containers whereby structurally strong and liquid tight joints or connections are provided.

The connecting or bonding element is generally referred to as fiberglass, and it will be understood that the term fiberglass includes fabric formed of woven spun glass or other fabric or fibres which are impregnated with plastic and other suitable material and bonded to the members being joined by means of glue, plastic, or other cementitious material.

The fabric or fiberglass by which the connecting material is designated is impregnated with a plastic and may be coated on one or both surfaces with a material suitable for cementing to the surfaces of the panels, such as the sides, deck, partitions and bottom of a boat, or to panels used for forming containers and the like.

Other features and advantages of the invention will appear from the following description taken in connection with the drawing, wherein:

Figure 1 is a view showing two straight wall sections or panels connected with fiberglass to former a corner or L-shaped unit.

Figure 2 is a similar view showing an additional layer of fiberglass positioned in the inner corner of the unit.

Figure 3 is a detail also showing an L-shaped unit with the fiberglass layers on the inner and outer surfaces and with plastic or glue extended into openings in the parts of the unit.

Figure 4 is a cross section taken on line 4—4 of Figure 3.

Figure 5 is a detail showing a further modification wherein the parts are held with a plurality of layers of fiberglass and plastic or the like on one side and the plastic extends into recesses in one of the sides of the parts.

Figure 6 is a cross section taken on line 6—6 of Figure 5.

Figure 7 is a detail showing another modification wherein a partition is secured to a base and side wall with fiberglass or the like, bonded with plastic or cement.

Figure 8 is a detail showing a still further modification wherein panels in a common plane are bonded.

Figure 9 shows panels positioned at an acute angle bonded with fiberglass or a similar plastic material.

Referring now to the drawing wherein like reference characters denote corresponding parts the improved joint or bond of this invention includes, in the design shown in Figure 1, panels 10 and 11 positioned to form a right angle, a layer 12 of fiberglass bonded to the surface 13 of the panel 10 and the surface 14 of the panel 11, and a layer 15 bonded to the surface 16 of the panel 11 and to the outer surface of the layer 12, as shown at the point 17. The layer 12 is also bonded to the edge 18 of the panel 10, and the layer 15 is bonded to the edge 19 of the panel 11. With the material of the bonding layers impregnated in the material of the fabric a permanent, and at the same time, rigid and sealed joint is provided.

In Figure 2 panels 20 and 21 are joined similar to the panels 10 and 11, and in addition a layer 22 of fiberglass or the like is positioned on the surfaces 23 and 24 of the panels 20 and 21, respectively, and part thereof is also bonded to the layer 25, similar to the layer 12.

In the design illustrated in Figure 3 panels 26 and 27 are bonded with layers 28 and 29 that extend across meeting edges of the panels, and the panel 26 is provided with openings 30 into which the plastic extends, as shown in Figure 4. Similar openings 31 are provided in the panel 27 and the bonding material also extends into these openings.

In Figures 5 and 6 panels or sections with recesses in the surfaces thereof are connected in a similar manner, wherein panels 32 and 33 with recesses 34 and 35 therein, respectively, are connected with a single layer 36 on one of the sides thereof and with a plurality of layers 37, 38 and 39 on the other side. The layer 36 extends into the recesses 34 and 35, as shown in Figure 6.

In Figure 7 a partition 40 is attached to a wall 41 and a floor or base 42 with a layer 43 of fiberglass or the like and the wall is connected to the floor with layers 44 and 45.

In Figure 8 panels or slabs 46 and 47 are bonded with layers 48 and 49 of fiberglass or the like, and in Figure 9 sheets 50 and 51 of material are bonded with layers 52 and 53, and with the parts arranged in this manner the binding material extends into an opening 54 between the edges of the sheets or panels.

By this means sections of walls, panels, blocks or other pieces of material may be positively bonded together with a plastic such as fiberglass, and the binding material is impregnated into the fibers of the plastic or the like providing an absolute bond.

It will be understood that only a few typical installations are illustrated and described, as this method of connecting pieces of material has numerous applications and is adapted for connecting meeting or adjoining edges of other devices. Materials other than fiberglass may also be used for the bonding layers.

It will be understood that other modifications may be made in the design and arrangement of the parts without departing from the spirit of the invention.

Although the bonding material has been described as applied in layers it will also be understood that to facilitate ease of assembly at the corners, joining fabric may be impregnated and pre-molded at the corner bend, so that the fabric will be pre-shaped before application to the assembly.

To further speed fabrication, heated formers or heated pressure blankets may be applied at the corner areas being joined.

Furthermore it will also be understood that the openings or recesses in the materials, may be in the form of notches or grooves in the surfaces or edges of the panels or walls.

The bonding material may, therefore, be in the form of layers of plastic, or fabric sheets or strips, impregnated with fiberglass or a suitable plastic, or it may be formed with strips or sheets or other suitable material, and the bonding material may be applied to the surfaces of the parts being joined, or to notches, openings, grooves or to roughened surfaces in said parts.

What is claimed is:

1. In a structural connection, a pair of panels arranged at right angles with respect to each other, each of said panels being provided with a plurality of recesses therein, a layer of plastic bonded fabric extending over one side of said panels and having portions extending into said recesses, and a plurality of plastic bonded fabric layers extended over the other sides of said panels.

2. A structural connection comprising a pair of panels arranged at right angles with respect to each other, said panels each having a plurality of recesses therein, said recesses being arranged in groups and all of the recesses in a particular group being parallel to each other, a layer of plastic bonded fabric extending over one side of said panels and having portions extending into said recesses whereby the fabric becomes secured to the panels, and a plurality of plastic bonded fabric layers extended over the other sides of said panels, said last named layers being arranged in superposed relation with respect to each other.

3. In a structural connection, a pair of panels arranged at right angles with respect to each other, each of said panels being provided with a plurality of recesses therein, said recesses being arranged in groups and all of the recesses in a particular group being parallel to each other, certain groups of recesses being arranged at right angles with respect to other groups of recesses, a layer of plastic bonded fabric extending over one side of said panels and having portions extending snugly into said recesses whereby the fabric becomes secured to the panels, and a plurality of plastic bonded fabric layers extended over the other sides of said panels, said last named layers being arranged in superposed relation with respect to each other, said fabric layers extending over the joints between said panels.

4. In a structural connection, a pair of panels arranged angularly with respect to each other, each of said panels being provided with recesses therein, a layer of fabric extending over one side of said panels and having portions extending into said recesses, and a plurality of layers extended over the other sides of said panels.

UNITED STATES PATENTS

References Cited in the file of this patent

| | | |
|---|---|---|
| 1,357,350 | Schumacher | Nov. 2, 1920 |
| 1,828,285 | Lewis | Oct. 20, 1931 |
| 1,880,785 | Card | Oct. 4, 1932 |
| 2,047,982 | Page | July 21, 1936 |
| 2,078,049 | Benedict | Apr. 20, 1937 |
| 2,252,539 | Adams | Aug. 12, 1941 |
| 2,314,523 | Speer | Mar. 23, 1943 |
| 2,318,053 | Brusse | May 4, 1943 |
| 2,359,633 | Ferguson | Oct. 3, 1944 |
| 2,391,791 | McHenry | Dec. 25, 1945 |
| 2,392,734 | Haberstump | Jan. 8, 1946 |
| 2,412,455 | Hall, Jr. | Dec. 10, 1946 |
| 2,412,693 | Pierson | Dec. 17, 1946 |
| 2,431,035 | Goepfert et al. | Nov. 18, 1947 |
| 2,457,002 | Spiro | Dec. 21, 1948 |
| 2,472,081 | Kantor | June 7, 1949 |
| 2,506,915 | Bishop | May 9, 1950 |
| 2,547,146 | Anthony | Apr. 3, 1951 |
| 2,635,308 | Crook | Apr. 21, 1953 |
| 2,651,588 | Bruce et al. | Sept. 8, 1953 |

FOREIGN PATENTS

| | | |
|---|---|---|
| 585,186 | Great Britain | Jan. 31, 1947 |